US011298674B2

(12) United States Patent
Nagata et al.

(10) Patent No.: US 11,298,674 B2
(45) Date of Patent: Apr. 12, 2022

(54) NITROGEN OXIDE STORAGE MATERIAL AND EXHAUST GAS PURIFICATION METHOD

(71) Applicant: TOYOTA JIDOSHA KABUSHIKI KAISHA, Toyota (JP)

(72) Inventors: Naoto Nagata, Gotemba (JP); Daisuke Shimoyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 16/375,369

(22) Filed: Apr. 4, 2019

(65) Prior Publication Data

US 2019/0321801 A1 Oct. 24, 2019

(30) Foreign Application Priority Data

Apr. 24, 2018 (JP) .............................. JP2018-082975
Jan. 8, 2019 (JP) .............................. JP2019-001170

(51) Int. Cl.
*B01J 20/02* (2006.01)
*B01J 20/08* (2006.01)
*B01J 20/28* (2006.01)
*B01J 20/30* (2006.01)
*F01N 3/08* (2006.01)

(52) U.S. Cl.
CPC ....... *B01J 20/0233* (2013.01); *B01J 20/0248* (2013.01); *B01J 20/08* (2013.01); *B01J 20/28059* (2013.01); *B01J 20/3028* (2013.01); *F01N 3/0814* (2013.01); *F01N 3/0842* (2013.01); *F01N 2240/18* (2013.01)

(58) Field of Classification Search
None
See application file for complete search history.

(56) References Cited

U.S. PATENT DOCUMENTS

| 6,979,435 | B1* | 12/2005 | Shahriari | .................. C01G 1/00 |
| | | | | 423/263 |
| 2006/0133977 | A1 | 6/2006 | Male et al. | |
| 2012/0275977 | A1* | 11/2012 | Chandler | ............. B01J 29/0352 |
| | | | | 423/213.5 |
| 2018/0104679 | A1 | 4/2018 | Suzuki et al. | |

FOREIGN PATENT DOCUMENTS

| CN | 103447033 | A | | 12/2013 |
| EP | 0577438 | A2 | | 1/1994 |
| JP | 61086944 | | * | 5/1986 |
| JP | 05-004135 | B2 | | 1/1993 |
| JP | H06154607 | A | | 6/1994 |
| JP | 2008-156130 | A | | 7/2008 |
| JP | 2013013894 | A | | 1/2013 |
| JP | 2017-189761 | A | | 10/2017 |
| WO | 2016/079507 | A1 | | 5/2016 |
| WO | 2016/158642 | A1 | | 10/2016 |
| WO | 2018123863 | A1 | | 5/2018 |
| WO | 2018123863 | A1 | | 7/2018 |

OTHER PUBLICATIONS

Haneda, Masaaki, et al. Structure of Ga2O3-Al2o3 prepared by sol-gel method. Applied Catalysis B: Envir. 31.81-02 (2001). (Year: 2001).*
Ono, Kuniyoshi et al. Machine Translation in English of: JP 61086944 (Year: 1986).*
Inge, Geukens, et al. "Ag nanoparticles on mixed Al2O3-Ga2O3 supports . . . ". Applied Catalysis A: General. 469. 373-379 (2014) (Year: 2014).*
Chen et al., Low Temperature NO Storage of Zeolite Supported Pd for Low Temperature Diesel Engine Emission Control, Catal Lett (2016) 146:1706-1711.
Machida et al., MnOx-CeO2 Binary Oxides for Catalytic NOx Sorption at Low Temperatures. Sorptive Removal of NOx, Chem. Mater. 2000, 12, 3158-3164, Sep. 29, 2000.
Ryou et al., Low temperature NO adsorption over hydrothermally aged Pd/CeO2 for cold start application, Catalysis Today 307 (2018) 93-101.
Lee et al., Vehicle emissions trapping materials: Successes, challenges, and the path forward, Applied Catalysis B Environmental 243 (2019) 397-414.

* cited by examiner

*Primary Examiner* — Sheng H Davis
(74) *Attorney, Agent, or Firm* — Dickinson Wright, PLLC

(57) ABSTRACT

An object of the present disclosure is to provide an $NO_x$ storage material having sufficient $NO_x$ storage capacity even in a low temperature region and a production method thereof.
An $NO_x$ storage material including a composite oxide of silver and gallium. The composite oxide of silver and gallium is preferably a delafossite-type composite oxide. The composite oxide is produced by dissolving a silver salt and a gallium salt in a solvent and baking the solution, wherein the molar ratio of silver:gallium is preferably from 2:8 to 7:3.

6 Claims, 14 Drawing Sheets

NITROGEN OXIDE STORAGE MATERIAL AND EXHAUST GAS PURIFICATION METHOD

TECHNICAL FIELD

The present invention relates to an $NO_x$ storage material capable of efficiently storing nitrogen oxide (hereinafter, referred to as $NO_x$) in the low temperature region, and an exhaust gas purification method using the $NO_x$ storage material.

BACKGROUND ART

Recent increasing demand for fuel-efficient vehicles is expected to promote lowering of the exhaust gas temperature. In turn, the challenge is to promote purification of harmful gas components at low temperatures. Among others, $NO_x$ emission control at a temperature lower than 200° C. that is a temperature at which the exhaust gas purification catalyst develops its activity is becoming a large challenge.

The temperature region in which the conventional exhaust gas purification catalyst functions is 250° C. or more, and it is therefore difficult to purify $NO_x$ generated before achieving sufficient warmup, for example, at the time of engine starting. Accordingly, as a means for controlling $NO_x$ emission from when sufficient warmup is not achieved until reaching a temperature region in which the catalyst functions, studies are being made on, for example, a method of disposing an $NO_x$ storage material in a first half of the catalyst, holding $NO_x$ in the $NO_x$ storage material in a low temperature region where the catalyst does not function, desorbing $NO_x$ from the $NO_x$ storage material in a temperature region where the catalyst exhibits activity, and purifying the desorbed $NO_R$.

As such a material for storing $NO_x$ in a low temperature region, $Ce_{1-x}Zr_xO_2$ is known. In this material, desorption of surface oxygen accompanied by reduction of Ce cation participates in oxidation of $NO_R$, and $NO_x$ is held as a nitrate (nitrite) salt having Ce as the cation. The $NO_x$ storage properties are further enhanced by making a noble metal including Pt be supported on such a material.

In addition, it has been recently proposed that a material obtained by ion exchanging Pd on to a zeolite compound such as chabazite exhibits high $NO_x$ adsorption properties (see, Low Temperature NO Storage of Zeolite Supported Pd for Low Temperature Diesel Engine Emission Control, Catal Lett (2016) 146:1706-1711). In this material, NO is molecularly adsorbed to the ion-exchanged Pd cation site, and high low-temperature $NO_x$ adsorption properties are thereby exerted.

On the other hand, studies are being made on an $NO_x$ storage material using no platinum group catalyst metal but using various nonmetals and include, for example, a study of Mn having high NO oxidation activity, and it was confirmed that a composite oxide composed of $MnO_x$ and $CeO_2$ manufactured by the coprecipitation method exhibits high $NO_x$ storage performance in a temperature region of 200° C. or less.

SUMMARY OF THE INVENTION

Problems to be Solved by the Disclosure

However, even the material described in Non-Paten Document 1 is not yet satisfied in terms of $NO_x$ storage capacity at low temperatures. Furthermore, in the composite oxide composed of $MnO_x$ and $CeO_2$, an essential requirement for exerting the performance is to contain a transition metal such as manganese, but since harmful effects of such a transition metal itself are pointed out, a material which uses an inexpensive metal without employing a transition metal and temporarily holds $NO_x$ in a low temperature region of 200° C. or less, is demanded. An object of the present invention is to solve these problems and provide an $NO_x$ storage material having sufficient $NO_x$ storage capacity even in a low temperature region without using a transition metal.

Features for Solving the Problems

The present invention achieves the object above by the following means.

<1> An NOx storage material including a composite oxide of silver and gallium.

<2> The NOx storage material according to <1> above, wherein the composite oxide further contains aluminum.

<3> The NOx storage material according to <1> or <2> above, wherein the composite oxide is a delafossite-type composite oxide.

<4> The $NO_x$ storage material according to any one of <1> to <3> above, wherein the concentration of the composite oxide is 1.7 mmol/g or more.

<5> A method for producing the $NO_x$ storage material according to any one of <1> to <4> above, including dissolving salts of metals constituting the composite oxide in a solvent, and baking the solution.

<6> The method according to <5> above, wherein the molar ratio of silver:gallium or silver:(gallium+aluminum) in the composite oxide is from 2:8 to 7:3.

<7> An $NO_x$ storage device having the $NO_x$ storage material according to any one of <1> to <4> above.

<8> An exhaust gas purification method including causing an exhaust gas discharged from an internal combustion engine to flow through the $NO_x$ storage device according to <7> above and then flow through an exhaust gas purification device having a catalyst metal.

Effects of the Invention

The $NO_x$ storage material of the present invention can develop high $NO_x$ storage capacity at low temperatures, particularly, at a low temperature of 200° C. or less.

BRIEF DESCRIPTION OF THE DRAWINGS

FIG. 5b is a graph illustrating the results of waveform separation between $Ag^0$ and $AgGaO_2$ at an isosbestic point of FIG. 5a.

MODE FOR CARRYING OUT THE INVENTION

The mode for carrying out the present invention is descried n detail below. However, the present invention is not limited to the following embodiments and can be conducted by making various modifications thereto within the scope of the gist of the present invention.

<$NO_x$ Storage Material>

The $NO_x$ storage material of the present invention contains a composite oxide of silver and gallium. The composite oxide may further contain aluminum. Aluminum substitutes for part of gallium in the composite oxide of silver and gallium.

Figure 1:
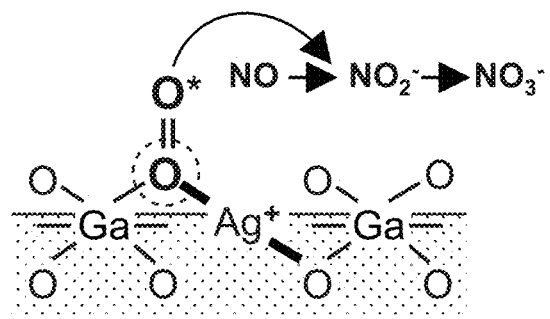
FIG. 1 is a diagram illustrating the reaction mechanism for oxidation of $NO_x$ on the $NO_x$ storage material of the present invention.

As illustrated in FIG. 1, the $NO_x$ storage material of the present invention contains a composite oxide in which silver (Ag) and gallium (Ga) are dissolved in solid solution, and the Ag—O—Ga site formed in the composite oxide functions as a low-temperature $NO_x$ storage reaction site. Then, it is considered that oxygen is activated on this site in a low temperature region, particularly in a low temperature region of 200° C. or less and the activated oxygen acts on the generation of nitrite salt ($NO_2^-$) and nitrate salt ($NO_3^-$) from NO, as a result, $NO_x$ is oxidatively stored. In addition, the composite oxide may be a composite oxide in which part of gallium in the composite oxide of silver and gallium is substituted by aluminum, and it is here considered that oxygen is activated on Ag—O—Ga(Al) site and $NO_x$ is oxidatively stored.

Figure 2:
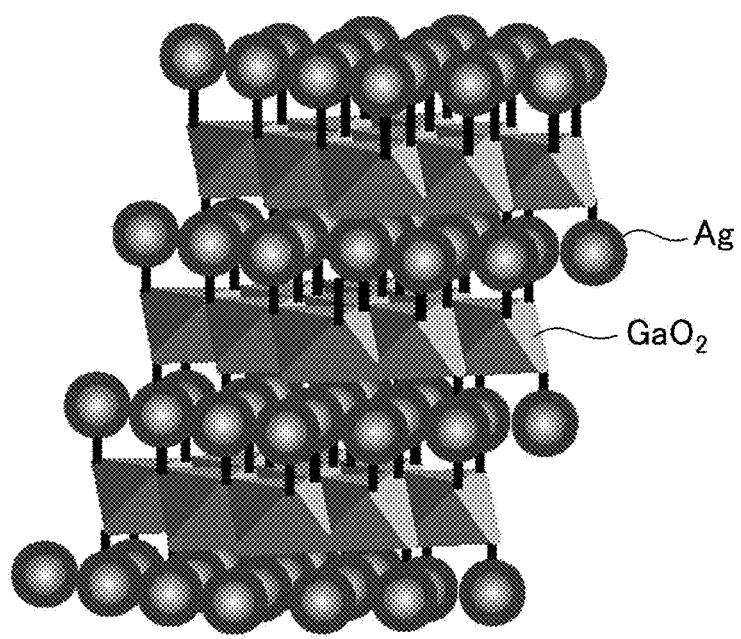
FIG. 2 is a schematic diagram illustrating the structure of a delafossite-type composite oxide.

In the composite oxide of silver and gallium contained in the $NO_x$ storage material of the present invention, the molar ratio between silver and gallium may be from 3:7 to 7:3 or from 4:6 to 6:4, and in the composite oxide of silver, gallium and aluminum, the molar ratio between silver and (gallium+aluminum) may be from 2:8 to 7:3. The composite oxide is preferably a delafossite-type composite oxide. FIG. 2 illustrates a schematic structure of the delafossite-type composite oxide. The delafossite-type structure is represented by $AgGaO_2$ or $AgAl_xGa_{1-x}O_2$ and is composed of monovalent cation $Ag^+$, trivalent cation $Ga^{3+}$, $Ag^{3+}$, and oxide ion $O^-$. In $AgAl_xGa_{1-x}O_2$, x is preferably from 0.1 to 0.9, more preferably from 0.1 to 0.5. The $AgGa(Al)O_2$ takes on a layered structure in which a $Ga(Al)O_2$ layer formed by sharing sides of $Ga(Al)O_6$ octahedron and an Ag layer are alternately stacked. Thanks to such a structure, many Ag—O—Ga sites can be present on the oxide surface and since the site functions as an active site for $NO_x$ storage reaction, the $NO_x$ storage performance is high.

In the $NO_x$ storage material of the present invention, the concentration of the composite oxide of silver and gallium may be 1.0 mmol/g or more and is preferably 1.7 mmol/g or more, or 1.8 mmol/g or more. In addition, the concentration may be 2.4 mmol/g or less.

The $NO_x$ storage material of the present invention exhibits higher $NO_x$ storage capacity than a compound in which palladium is ion exchanged on to a zeolite compound such as chabazite conventionally used as the $NO_x$ storage material, in a low temperature region, particularly in a low temperature region of 200° C. or less, furthermore 100° C. or less.

<Production Method of $NO_x$ Storage Material>

The $NO_x$ storage material of the present invention can be produced by any method commonly employed as the production method of a composite oxide and in particular, can be produced by the following method of the present invention.

The method for producing the $NO_x$ storage material of the present invention includes dissolving salts of metals constituting the composite oxide, i.e., a silver salt, a gallium salt and, if desired, an aluminum salt, in a solvent, and baking the solution. As the silver salt, gallium salt and aluminum salt, a nitrate, a carbonate, etc. employed in a general production method of a composite oxide can be used. As the solvent, a solvent capable of dissolving these salts, for example, water, can be used. The silver salt and gallium salt are preferably mixed in a ratio such that the molar ratio of silver and gallium Ag:Ga becomes from 2:8 to 7:3, from 3:7 to 7:3, or from 4:6 to 6:4, and here, part of the gallium, i.e., from 10 to 90 mol % or from 10 to 50 mol %, may be substituted by aluminum.

The baking temperature is usually 250° C. or more, preferably 300° C. or more, and is 600° C. or less, preferably 400° C. or less. The baking may be performed in air or in oxygen but is preferably performed in oxygen. The baking time can be appropriately determined according to the balance with the baking temperature and is usually from 1 to 10 hours.

The baking is preferably performed in the presence of a fuel. As the fuel, glycine, glucose, sucrose, urea, citric acid, hydrazine, carbohydrazine, oxalyl dihydrazine, acetylacetone, hexamethylenetetramine, etc. can be used.

<$NO_x$ Storage Device>

The $NO_x$ storage device of the present invention has the above-described $NO_x$ storage material. In the $NO_x$ storage device of the present invention, the $NO_x$ storage material may be configured to be housed in a case, or the $NO_x$ storage material may be supported on a support particle and then housed.

The support particle includes particles of a metal oxide such as alumina ($Al_2O_3$), zirconia ($ZrO_2$), ceria ($CeO_2$), silica ($SiO_2$), magnesia (MgO) and titanium oxide (titania: $TiO_2$), or a composite oxide thereof (for example, a ceria-zirconia ($CeO_2$—$ZrO_2$) composite oxide). Among these, particles of alumina, zirconia, and a ceria-zirconia composite oxide are preferred.

<Exhaust Gas Purification Method>

The exhaust gas purification method of the present invention includes causing an exhaust gas discharged from an internal combustion engine to flow through the $NO_x$ storage device above and then flow through an exhaust gas purification device having a catalyst metal.

An exhaust gas discharged from an internal combustion engine is first flowed through the $NO_x$ storage device and put into contact with the $NO_x$ storage material, and $NO_x$ in the exhaust gas can thereby be stored at a low temperature as in starting of the internal combustion engine, particularly, at a low temperature of 100° C. Then, when the exhaust gas reaches a high temperature, $NO_x$ stored is desorbed from the $NO_x$ storage material and reduced by flowing through an exhaust gas purification device having a catalyst metal and consequently, the harmful component in the exhaust gas is purified.

As the catalyst metal in the exhaust gas purification device, one or a plurality of metals such as platinum (Pt), rhodium (Rh), palladium (Pd), ruthenium (Ru), iridium (Ir) and osmium (Os) can be used.

Although not particularly limited, the content of the catalyst metal relative to the total volume of the catalyst in the exhaust gas purification device is, usually, appropriately from 0.5 to 10 g/L and is preferably, for example, from 0.5 to 7.0 g/L. If the amount of the catalyst metal supported is too small, the catalytic activity (in particular, oxidation catalytic activity) by virtue of the catalyst metal is insufficient, and on the other hand, if the amount of the catalyst metal supported is too large, the catalyst metal is likely to undergo grain growth and at the same time, a cost disadvantage occurs.

The catalyst in the exhaust gas purification device can be used as a pellet by itself or may be used by disposing it on a substrate. As the substrate, the same substrate as employed in the conventionally known exhaust gas purification catalyst can be used. For example, the substrate is preferably a substrate composed of a heat-resistant material having a porous structure. The heat-resistant material includes a heat-resistant metal such as cordierite, silicon carbide (SiC), aluminum titanate, silicon nitride and stainless steel, an alloy thereof, etc. In addition, the substrate preferably has a honeycomb structure, a foam shape, a pellet shape, etc. Incidentally, as for the outer shape of the substrate as a whole, a cylindrical shape, an elliptic cylindrical shape, a polygonal cylindrical shape, etc. can be employed.

EXAMPLE

Example 1 (Ag3Ga7 Composite Oxide)

2.55 g (15 mmol) of silver nitrate ($AgNO_3$), 14.0 g (35 mmol) of gallium nitrate n-hydrate ($Ga(NO_3)_3 \cdot nH_2O$) and 1.41 g (19 mmol) of glycine were put in a 200 mL beaker and dissolved by adding 10 mL of distilled water. The resulting solution was placed in a muffle furnace, heated to 350° C. at 5.4° C./min and further burned in air at 350° C. for 1 hour. The obtained solid was put in a mortar and pulverized, and the obtained powder was then fired at 500° C. for 2 hours. The powder was compact-molded at 2 t/cm$^2$ to obtain a pellet having a diameter ($\phi$) of 1.0 to 1.7 mm. The composite oxide thus produced at a charging ratio of silver and gallium of 3:7 is referred to as Ag3Ga7 composite oxide in the present description.

Example 2 (Ag5Ga5 Composite Oxide)

A pellet was produced in the same manner as in Example 1 using 4.25 g (25 mmol) of silver nitrate ($AgNO_3$), 10.0 g (25 mmol) of gallium nitrate n-hydrate ($Ga(NO_3)_3 \cdot nH_2O$) and 1.41 g (19 mmol) of glycine.

Example 3 (Ag7Ga3 Composite Oxide)

A pellet was produced in the same manner as in Example 1 using 5.95 g (35 mmol) of silver nitrate ($AgNO_3$), 6.0 g (15 mmol) of gallium nitrate n-hydrate ($Ga(NO_3)_3 \cdot nH_2O$) and 1.41 g (19 mmol) of glycine.

Example 4 (Ag1Ga9 Composite Oxide)

A pellet was produced in the same manner as in Example 1 using 0.85 g (5 mmol) of silver nitrate ($AgNO_3$), 18.0 g (45 mmol) of gallium nitrate n-hydrate ($Ga(NO_3)_3 \cdot nH_2O$) and 1.41 g (19 mmol) of glycine.

Example 5 (Ag5Al1.5Ga3.5 Composite Oxide)

A pellet was produced in the same manner as in Example 1 using 4.25 g (25 mmol) of silver nitrate ($AgNO_3$), 7.0 g (17.5 mmol) of gallium nitrate n-hydrate ($Ga(NO_3)_3 \cdot nH_2O$), 2.81 g (7.5 mmol) of aluminum nitrate nonahydrate ($Al(NO_3)_3 \cdot 9H_2O$) and 0.62 g (8.3 mmol) of glycine.

Example 6 (Ag5Al2.5Ga2.5 Composite Oxide)

A pellet was produced in the same manner as in Example 1 using 4.25 g (25 mmol) of silver nitrate ($AgNO_3$), 5.0 g (12.5 mmol) of gallium nitrate n-hydrate ($Ga(NO_3)_3 \cdot nH_2O$), 4.69 g (12.5 mmol) of aluminum nitrate nonahydrate ($Al(NO_3)_3 \cdot 9H_2O$) and 0.62 g (8.3 mmol) of glycine.

Example 7 (Ag5Ga5 Composite Oxide)

A pellet was produced in the same manner as in Example 1 using 4.25 g (25 mmol) of silver nitrate ($AgNO_3$), 10.0 g (25.0 mmol) of gallium nitrate n-hydrate ($Ga(NO_3)_3 \cdot nH_2O$) and 0.62 g (8.3 mmol) of glycine.

Example 8 (Ag5Al0.5Ga4.5 Composite Oxide)

A pellet was produced in the same manner as in Example 1 using 4.25 g (25 mmol) of silver nitrate ($AgNO_3$), 9.0 g (22.5 mmol) of gallium nitrate n-hydrate ($Ga(NO_3)_3 \cdot nH_2O$), 0.94 g (2.5 mmol) of aluminum nitrate nonahydrate ($Al(NO_3)_3 \cdot 9H_2O$) and 0.62 g (8.3 mmol) of glycine.

Comparative Example 1 ($Ga_2O_3$)

A pellet was produced in the same manner as in Example 1 using 22.0 g (50 mmol) of gallium nitrate n-hydrate ($Ga(NO_3)_3 \cdot nH_2O$) and 1.41 g (19 mmol) of glycine.

Comparative Example 2 (Ag Powder)

A silver powder produced by Wako Pure Chemical Industries, Ltd. was used.

Comparative Example 3 (Pd-Chabazite)

A material obtained by loading 1 wt % of palladium on chabazite ($SiO_2/Al_2O_3$=13, BET surface area: 504 m$^2$/g) was used.

<Measurement Method and Evaluation>

With respect to the samples obtained, the properties were measured using the following methods and evaluated.

(XRD)

The measurement was performed using RINT2000 manufactured by Rigaku Corporation with an X-ray source of CuKα (λ=1.5418 nm) under the conditions of a range from 10 to 90 deg., a step width of 0.02 deg., a tube voltage of 50 kV and a tube current of 300 mA. The diffraction peak positions were compared with known data of JCPDS data file. The crystallite diameter was determined using the Scherrer equation.

(Specific Surface Area Analysis)

The measurement was performed at 77 K by the nitrogen adsorption/desorption method with use of BELSORP-max-12-N-VP manufactured by MicrotracBEL Corp. The measurement sample was subjected to vacuum pretreatment for 3 hours at 250° C. The specific surface area was calculated from the straight portion f of BET curve.

(STEM-EDS Mapping Analysis)

Observation was performed under a transmission scanning microscope (STEM) by using JEM-1000 (accelerating voltage: 200 kV) manufactured by JEOL Ltd. The sample powder was dispersed in ethanol, dropped on a copper grid, then dried and measured.

(XAFS Analysis)

The analysis was performed at BL07 Experimental Station of The Kyushu Synchrotron Light Research Center. The spectrum was measured by a transmission method using an ion chamber by means of an Si (220) double crystal spectrometer.

($O_2$-TPD Analysis)

In the measurement, Belcat A manufactured by Microtrac-BEL Corp. was used. 200 mg of the sample powder was accurately weighed and put in a sample tube, 20 Vol % $O_2$/He was flowed at 30 mL/min, and after the temperature was raised to 500° C. and this temperature was maintained for 10 minutes, the system was cooled to 50° C. in the same atmosphere. The gas in the tube was substituted by He gas at 50° C., He was then flowed at 30 mL/mi, the temperature was raised to 500° C. while heating the sample at 10° C./min, and the $O_2$ desorption amount was analyzed by TCD.

(IR Analysis)

In the measurement, Jasco FT/IR-6200 infrared spectrophotometer manufactured by JASCO Corp. was used. A sample and KBr were mixed at a weight ratio of 3:7 in a mortar, 12 mg was accurately weighed and compact-molded into a disk of 8 mm in diameter ϕ, and the disk was used as the sample. As for the window material, $CaF$ was used. As a pretreatment operation, an operation of flowing a mixed gas of $O_2$ 3%/Ar balance at a total flow rate of 200 mL/min at 350° C. for 5 minutes and subsequently introducing a mixed gas of $H_2$ 5%/Ar balance for 10 minutes was repeatedly performed. The mixed gas of $O_2$ 3%/Ar balance at the same flow rate was cooled to the measurement temperature, background measurement was then performed, a mixed gas of NO 400 ppm+$O_2$ 9%/Ar balance was flowed, and the spectra after 2, 5, 10, 15, 20, 30, 40, 50 and 60 minutes were measured. The measurement temperature was set to be 100° C., and in the measurement range of 1,000 to 4,000 $cm^{-1}$, 128 co-added scans were collected at 4 $cm^{-1}$ resolution.

($NO_x$-TPD Analysis)

In a flow reactor, 1 mL of a pellet catalyst was placed, and each gas at 180° C., 140° C. and 100° C. was analyzed by an FT-IR analyzer (SESAM-HL, BEST Instruments Co., Ltd.). After evaluating the below-described $NO_x$ storage properties, the sample was heated at 20° C./min under $N_2$ flow, and the desorbed NOx species was analyzed.

(Evaluation of $NO_x$ Storage Properties)

In a flow reactor, 1 mL of a pellet sample produced in each of Examples and Comparative Examples was placed, and the conversion behavior of each gas at 180° C., 140° C. and 100° C. was analyzed by an FT-IR analyzer (SESAM-HL, BEST Instruments Co., Ltd.) and a magnetic-pressure analyzer (Bex, BEST Instruments Co., Ltd.). After performing a reduction pretreatment at 500° C. for 5 minutes under $H_2$ flow, the gas was switched to a $O_2$ 9%+$CO_2$ 10%+water 10%/$N_2$ gas, and a pretreatment was performed at the same temperature for 5 minutes. In the same oxidizing atmosphere, the gas was cooled to the evaluation temperature, the lean gas shown in Table 1 below was introduced at 1 L/min for 15 minutes, and the $NO_x$ storage amount was calculated based on the difference from the $NO_x$ profile in a blank test where the catalyst was not placed.

TABLE 1

| Gas | NO/ppm | $O_2$/vol % | $CO_2$/vol % | $H_2O$/vol % |
|---|---|---|---|---|
| Density | 400 | 9 | 10 | 10 |

<Measurement Results>

(Specific Surface Area)

The composition ratio and specific surface area of each of the samples obtained in Examples and Comparative Examples are shown in Table 2 below.

TABLE 2

| | Cation, Molar Ratio/mol % | | | |
|---|---|---|---|---|
| Sample | Ag | Al | Ga | $S_{BET}$/$m^2g^{-1}$ |
| $Ga_2O_3$ (Comparative Example 1) | 0 | 0 | 50 | 83.0 |
| Ag1Ga9 (Example 4) | 10 | 0 | 90 | 41.0 |
| Ag3Ga7 (Example 1) | 30 | 0 | 90 | 36.0 |
| Ag5Ga5 (Example 2) | 50 | 0 | 50 | 27.0 |
| Ag7Ga3 (Example 3) | 70 | 0 | 30 | 20.0 |
| Ag5Al1.5Ga3.5 (Example 5) | 50 | 15 | 35 | 37.6 |
| Ag5Al2.5Ga2.5 (Example 6) | 50 | 25 | 25 | 64.6 |
| Ag5Ga5 (Example 7) | 50 | 0 | 50 | 22.0 |
| Ag5Al0.5Ga4.5 (Example 8) | 50 | 5 | 45 | 23.6 |
| Pd-Chabazite (Comparative Example 3) | | | | 504.0 |

(Results of Structural Analysis by XRD)

Figure 3:
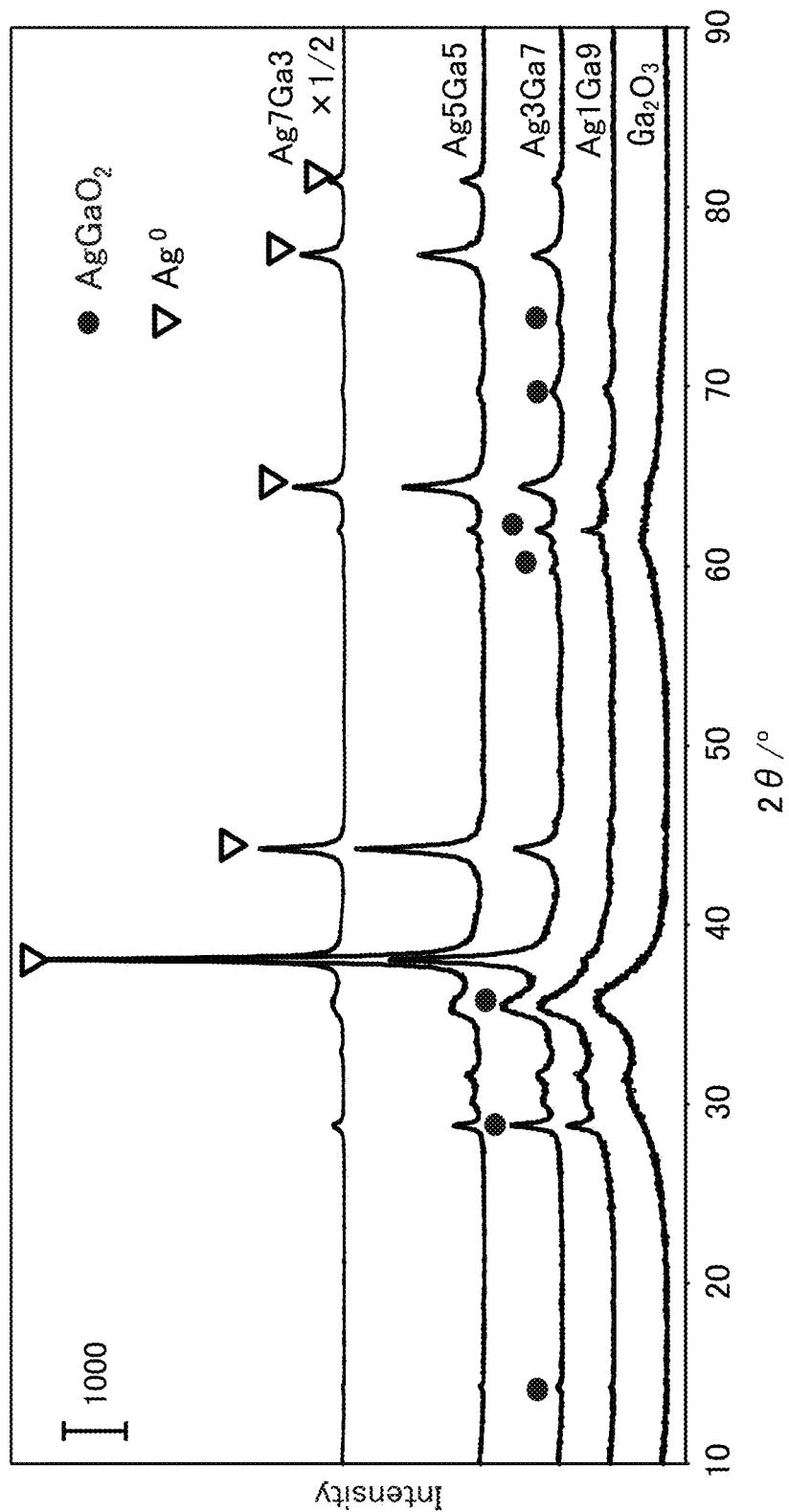
FIG. 3 is an XRD diffraction pattern of each sample obtained in Examples.
Figure 9:
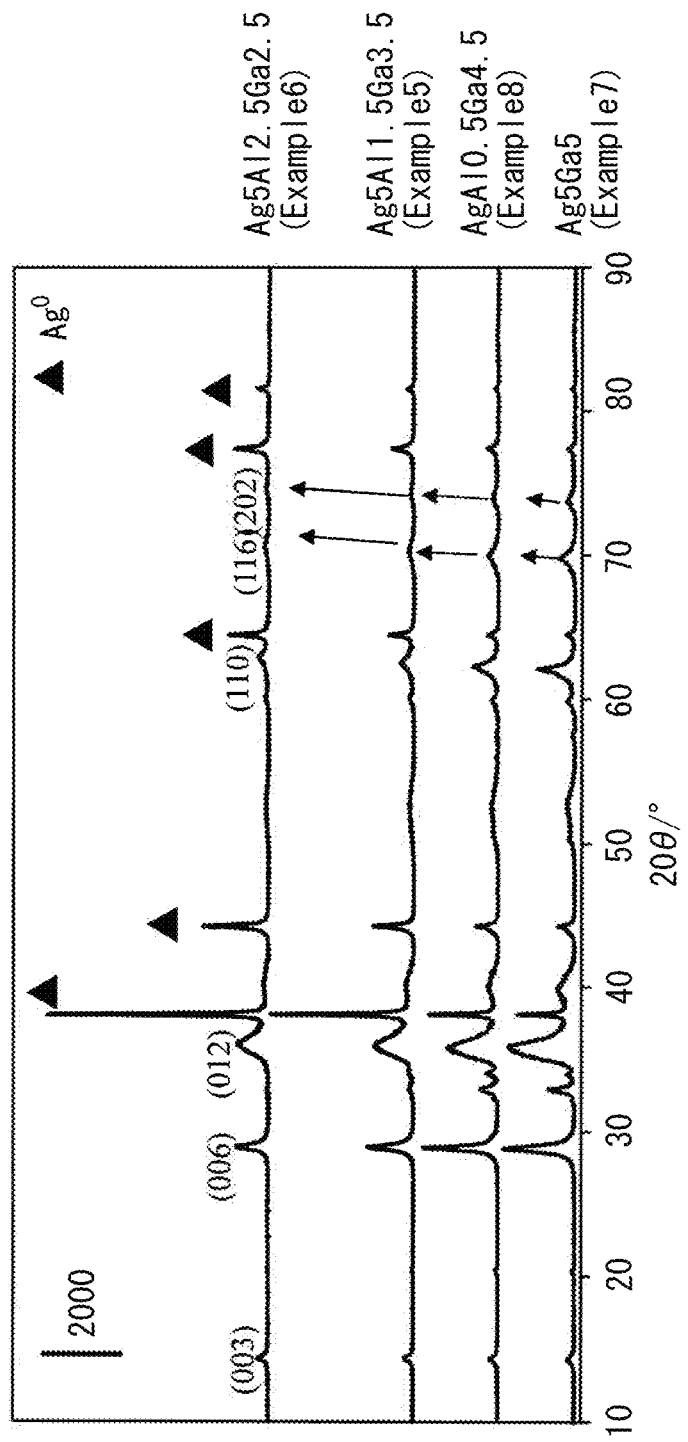
FIG. 9 is an XRD diffraction pattern of each sample obtained in Examples.

An XRD diffraction pattern of each sample is illustrated in FIGS. 3 and 9. As illustrated in FIG. 3, diffraction peaks based on delafossite-type $AgGaO_2$ oxide were detected in the samples except for $Ga_2O_3$. In addition, in the Ag3Ga7 composite oxide (Example 1), the diffraction intensity of the oxide above was highest. Furthermore, as illustrated in FIG. 9, a diffraction line of Ag metal was detected in diffraction patterns of all products, as well as delafossite-type $AgAl_xGa_{1-x}O_2$, and the products were confirmed to be a mixture of both. Moreover, since the diffraction line of $AgAl_xGa_{1-x}O_2$ is shifted to the high angle side as the Al composition ratio increases, it is understood that a structure in which Ga is substituted by Al was produced. It is also suggested that with an increase in the Al ratio, coarse Ag metal increases.

Figure 10:
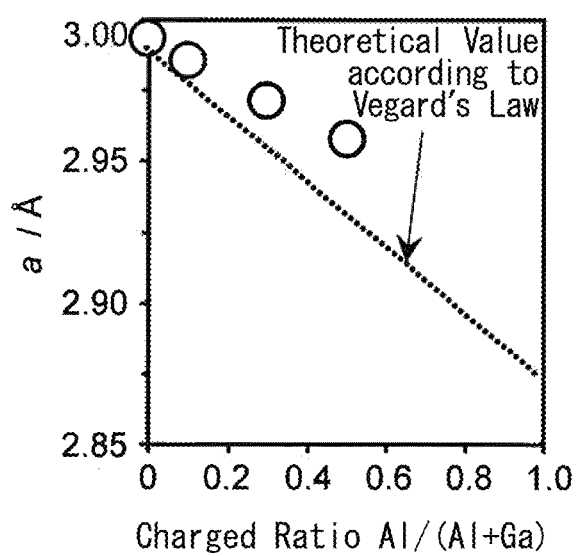
FIG. 10 is a graph illustrating the relationship between the Al charging ratio and the lattice length.
Figure 10:
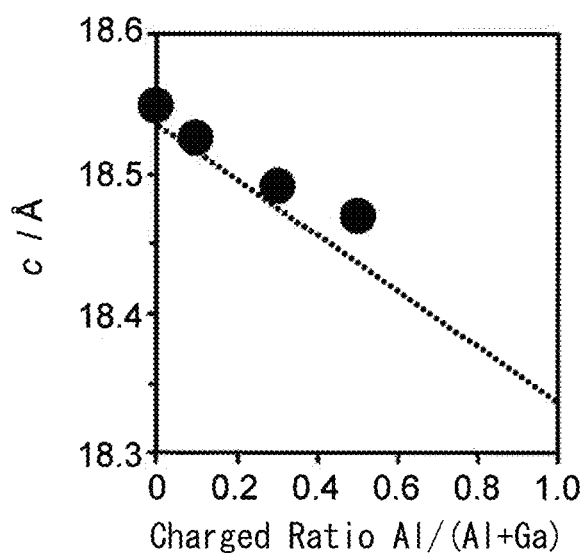

FIG. 10 illustrates the dependency of a lattice parameter calculated from the analysis of FIG. 9 on the Al charging ratio. Both a-axis length and c-axis length are decreased as the Al ratio increases, and it is therefore revealed that a delafossite-type oxide in which part of Ga is substituted by Al was produced. However, the results were not in complete agreement with the theoretical values according to Vegard's Law, and this suggests that part of Al was not substituted by and the oxide was present as $Al_2O_3$, etc.

(Results of Structural Analysis by STEM)

Figure 4A:
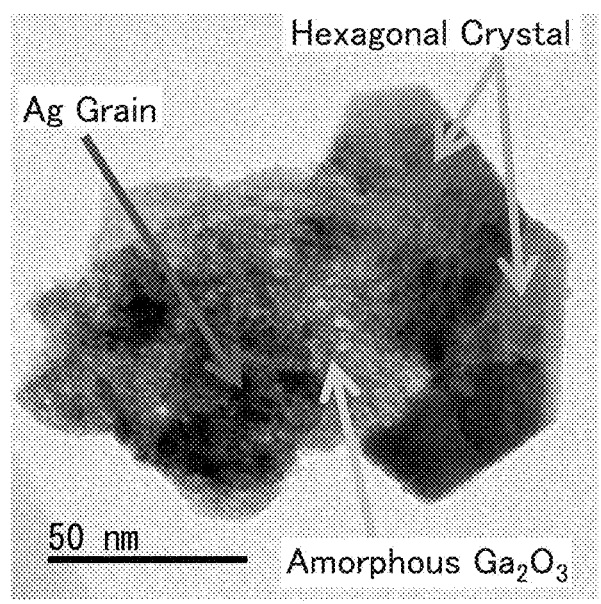
FIG. 4a is a DF-STEM observation image of Ag3Ga7 composite oxide (Example 1).
Figure 4B:
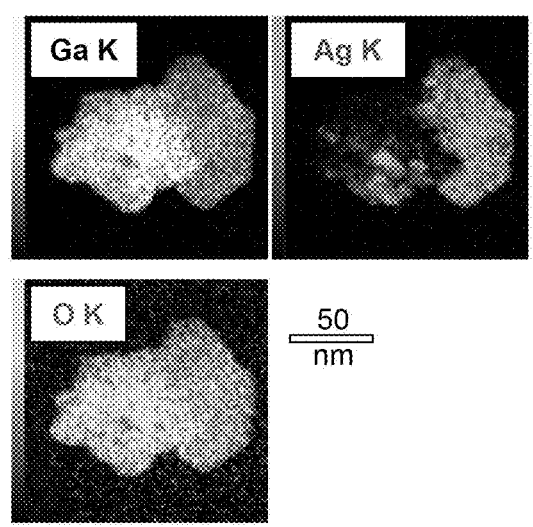
FIG. 4b is an EDS mapping image of Ag3Ga7 composite oxide (Example 1).

FIG. 4a illustrates a DF-STEM observation image of Ag3Ga7 composite oxide (Example 1), and FIG. 4b illustrates an EDS mapping image thereof. As well as Ag grain and $Ga_2O_3$, a hexagonal oxide in which the composition distribution of Ag, Ga and O is uniform can be confirmed. This oxide is expected to be the delafossite-type $AgGaO_2$ oxide detected in the XRD diffraction pattern of FIG. 3.

(Results of Structural Analysis by XAFS)

Figure 5A:
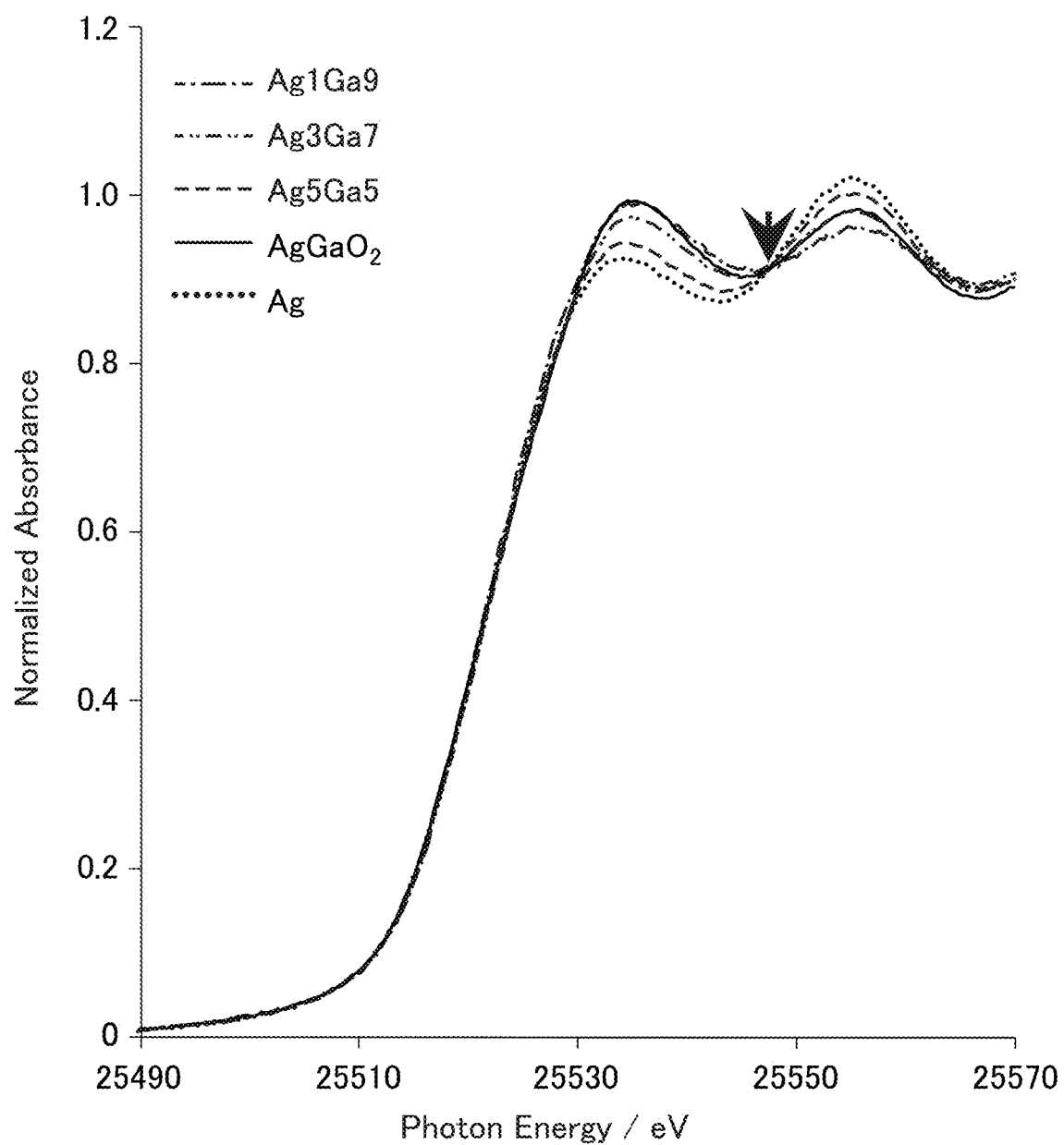
FIG. 5a is a graph illustrating XAFS analysis results of each sample obtained in Examples 1, 2 and 4, reference sample $AgGaO_2$, and copper foil.

FIG. 5a illustrates XAFS analysis results of samples of Examples 1, 2 and 4, sample of Comparative Example 2, $AgGaO_2$ as reference sample, and Ag. The absorption spectrum of each sample changes through the isosbestic point in accordance with the difference in the Ag/Ga ratio, and this indicates a change due to difference in the abundance ratio of two components of Ag and $AgGaO_2$.

Figure 5B:
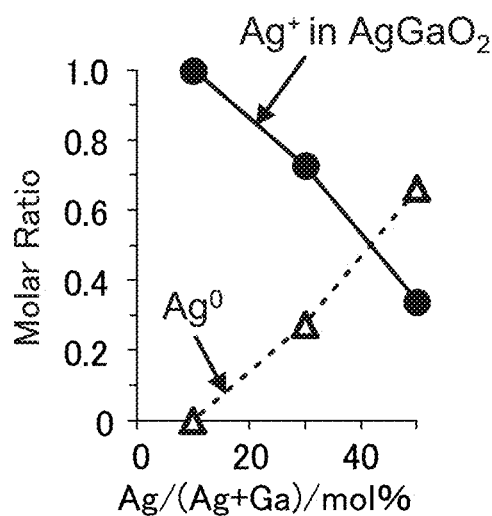

FIG. 5b illustrates the results of waveform separation of the XAFS spectrum of FIG. 5a into spectra of $Ag^0$ and $AgGaO_2$ and calculation of each component fraction. Based on the results of FIG. 5b, Ag component per weight of the material was quantitatively determined. The quantitative determination method was as follows. First, $AgGaO_2$ was dissolved in aqua regia. Thereafter, the solution was vaporized in ICP, and the Ag concentration was quantitatively determined. The value of FIG. 5c can be derived by multiplying the quantitatively determined Ag concentration by the component fraction calculated in XAFS analysis.

Figure 5C:
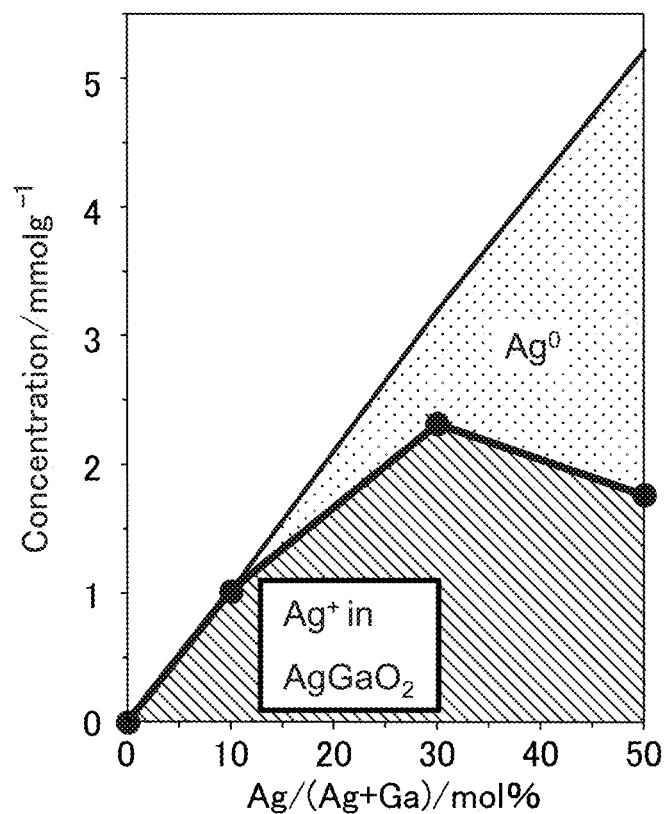
FIG. 5c is a graph illustrating quantitative results of each component in FIG. 5b.

As illustrated in FIG. 5c, it is understood that $AgGaO_2$ is contained in a largest amount in the Ag3Ga7 composite oxide (Example 1). It is seen from the results of FIG. 5c that when Ag is 20 mol %, $AgGaO_2$ is present in an amount of 1.7 mmol per g of the sample; when Ag is 10 mol %, $AgGaO_2$ is present in an amount of 1.0 mmol per g of the sample; when Ag is 30 mol %, $AgGaO_2$ is present in an amount of 2.4 mmol per g of the sample; and when Ag is 50 mol %, $AgGaO_2$ is present in an amount of 1.8 mmol per g of the sample.

($O_2$-TPD Analysis Results)

Figure 6:
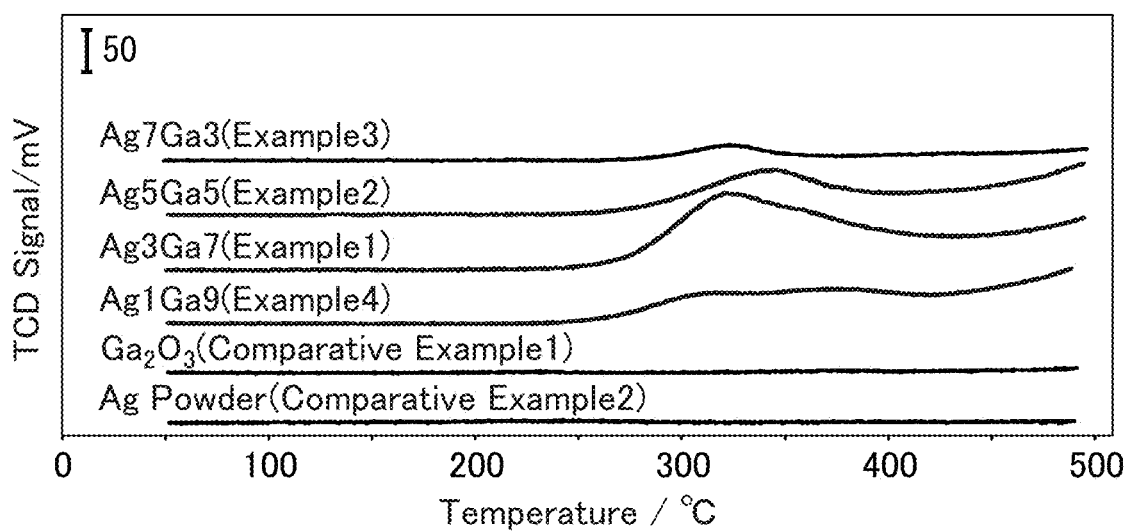
FIG. 6 is a graph illustrating an $O_2$-TPD measurement profile of each sample obtained in Examples 1 to 4 and Comparative Examples 1 and 2.

FIG. 6 illustrates an $O_2$-TPD measurement profile. As illustrated in FIG. 6, a desorbed species was not detected in $Ga_2O_3$ (Comparative Example 1) and Ag powder (Comparative Example 2), but on the other hand, an oxygen desorption peak was detected around 320° C. in $AgGaO_2$-containing composite oxides (Examples 1 to 4). This desorption peak is considered to be active oxygen desorbed from the Ag—O—Ga site.

(Analysis Results of $NO_x$ Adsorption Species by IR)

Figure 7:
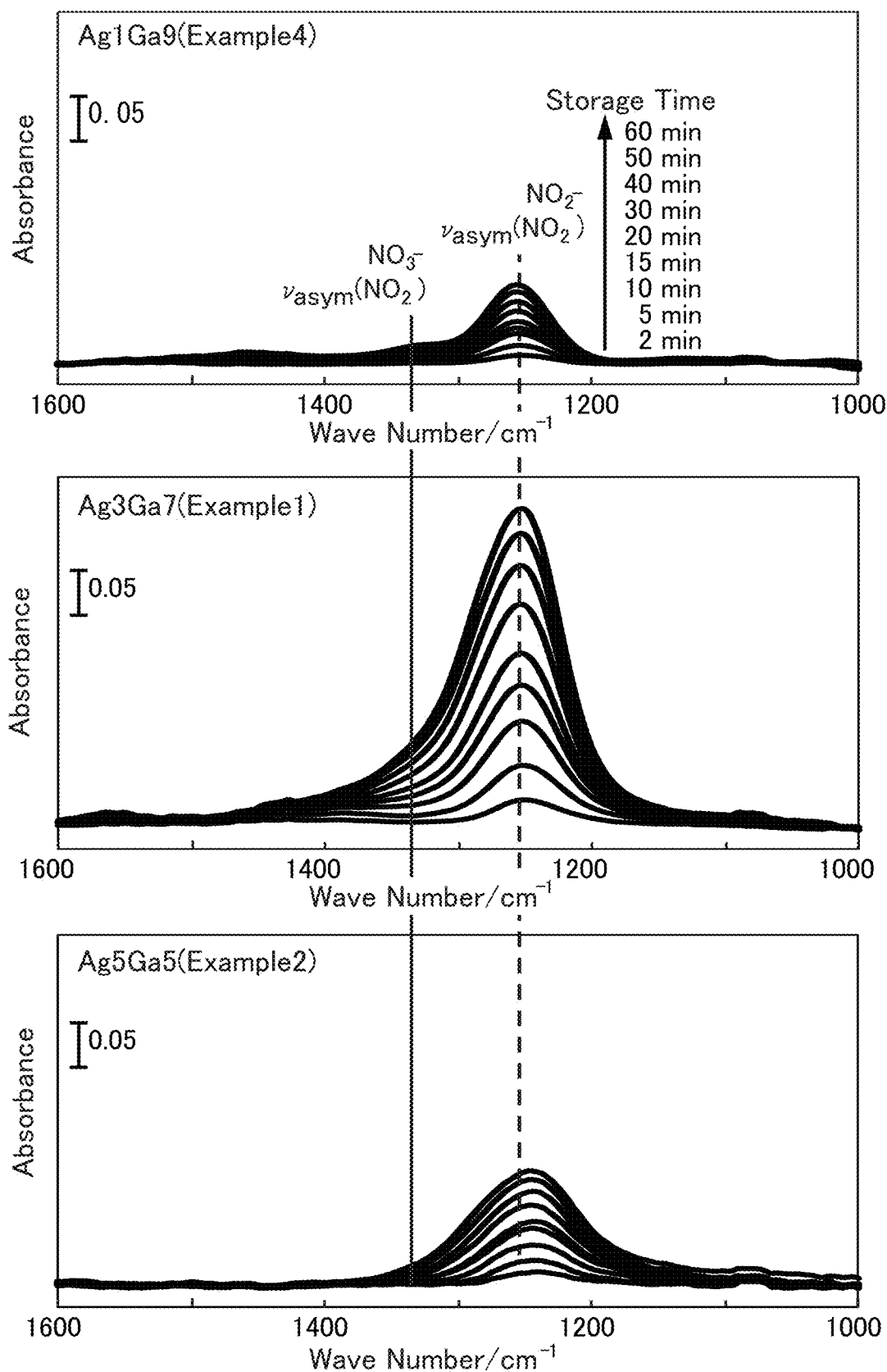
FIG. 7 is a graph illustrating IR analysis results of each sample obtained in Examples 1, 2 and 4.

FIG. 7 illustrates IR analysis results in an environment where NO and $O_2$ were flowed at 100° C., with respect to the samples of Examples 1, 2 and 4. An absorption peak assigned to nitrite salt ($NO_2^-$) and a shoulder assigned to nitrate salt ($NO_3^-$) were detected at 1,255 $cm^{-1}$. These results reveal that the gas phase NO was oxidized by oxygen and stored as nitrite salt and nitrate salt in the sample.

($NO_x$ Storage Test Results)

Figure 8A:
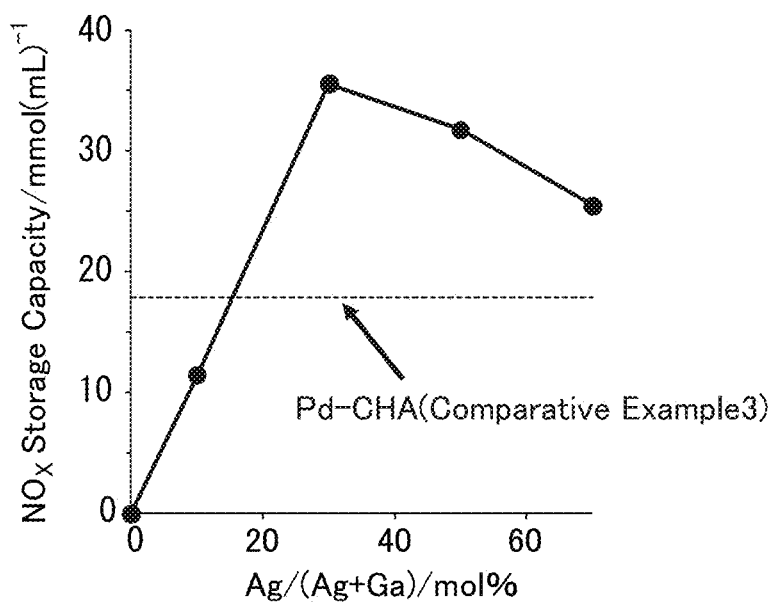
FIG. 8a is a graph illustrating the $NO_x$ storage amount per volume of each sample obtained in Examples 1 to 4 and Comparative Example 1.
Figure 8B:
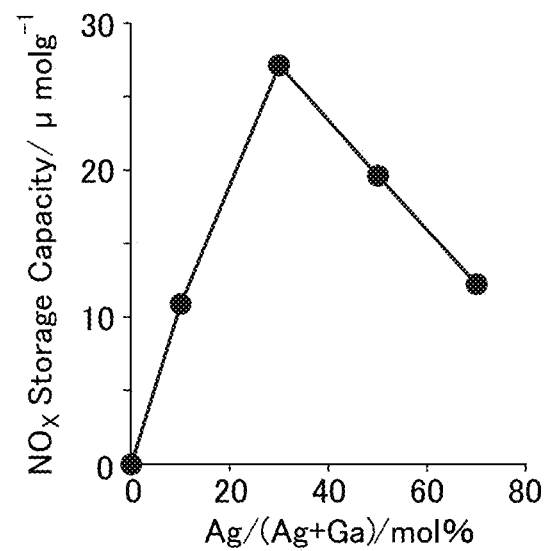
FIG. 8b is a graph illustrating the $NO_x$ storage amount per weight of each sample obtained in Examples 1 to 4 and Comparative Example 1.

FIGS. 8a and 8b illustrate quantitative values of the $NO_x$ storage amount at 100° C. with respect to each sample of Examples 1 to 4 and Comparative Examples 1 and 3. FIG. 8a illustrates the $NO_x$ storage amount per volume of the sample, and FIG. 8b illustrates the $NO_x$ storage amount per weight of the sample. The relationship between the $NO_x$ storage amount per volume or weight of the sample and the Ag composition ratio illustrated in FIGS. 8a and 8b showed a tendency to increase in the $NO_x$ storage amount due to combining Ag and Ga and configure a mountain shape with Ag/(Ag+Ga)=30 mol % at the top. It is revealed that the sample having a large storage amount (Ag3Ga7: Example 1, Ag5Ga5: Example 2, Ag7Ga3: Example 3) allows the presence of many effective sites for $NO_x$ storage and exhibits high properties in terms of the storage amount per volume, compared with Pd-chabazite known to have high low-temperature $NO_x$ storage properties (FIG. 8a). In addition, the sample Ag1Ga9 (Example 4) also exhibited sufficient storage amount, though the $NO_x$ storage amount was lower than Pd-chabazite. The order of $NO_x$ storage amount per weight relative to the Ag/(Ag+Ga) composition was completely in agreement with the order of the $AgGaO_2$ content (FIG. 5c) and therefore, $AgGaO_2$ is expected to assume the storage reaction.

Figure 11:
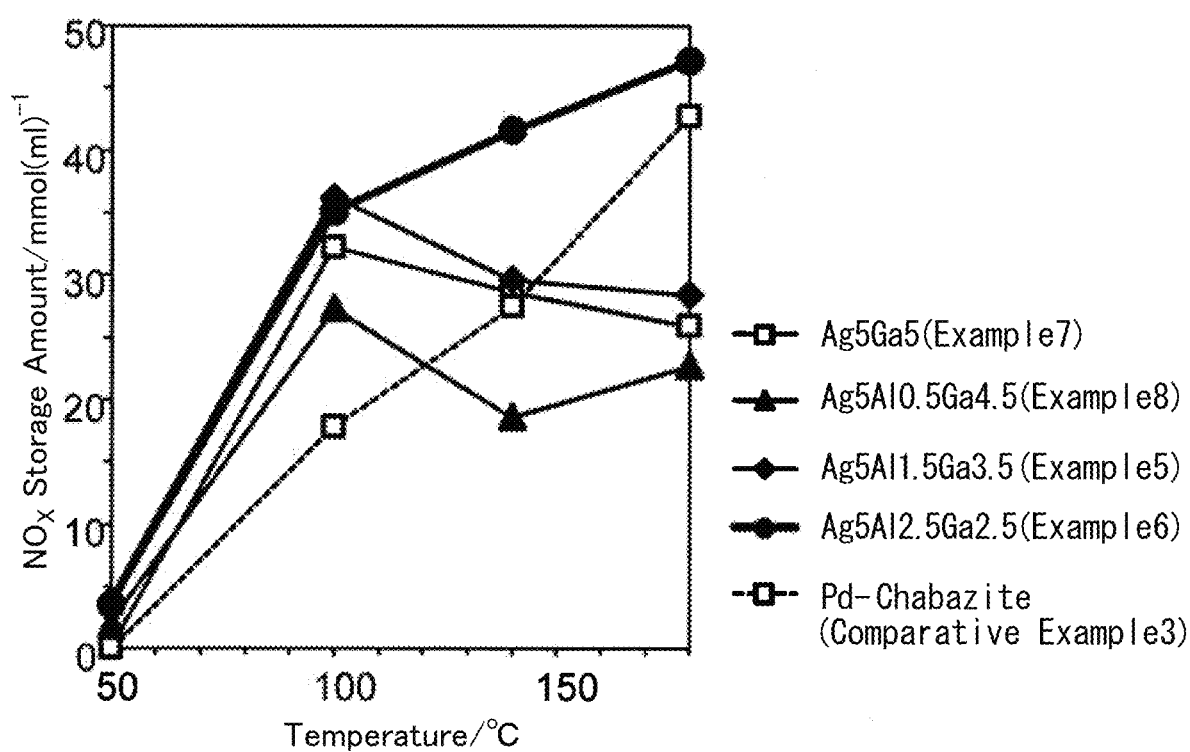
FIG. 11 is a graph illustrating the relationship between the temperature and the $NO_x$ storage amount.

FIG. 11 illustrates the $NO_x$ storage amounts at 50° C., 100° C., 140° C. and 180° C. of each sample of Examples 5 to 8 and Comparative Example 3 (Pd-chabazite). Comparing with Ag5Ga5 (Example 7), in Ag5Al0.5Ga4.5 (Example 8), the $NO_x$ storage amount was low in the temperature region of 120 to 180° C. but the $NO_x$ storage amount was high at a temperature of 100° C. or less. In Ag5Al1.5Ga3.5 (Example 5) and Ag5Al2.5Ga2.5 (Example 6), where the Al ratio was further lager than in Ag5Al0.5Ga4.5 (Example 8), the $NO_x$ storage amount was higher than Ag5Ga5 (Example 7) in the temperature region of 140° C. or less. Furthermore, in Ag5Al2.5Ga2.5 (Example 6), the $NO_x$ storage amount was higher than Pd-chabazite (Comparative Example 3) in entire temperature region of 180° C. or less.

($NO_x$-TPD Analysis Results)

Figure 12:
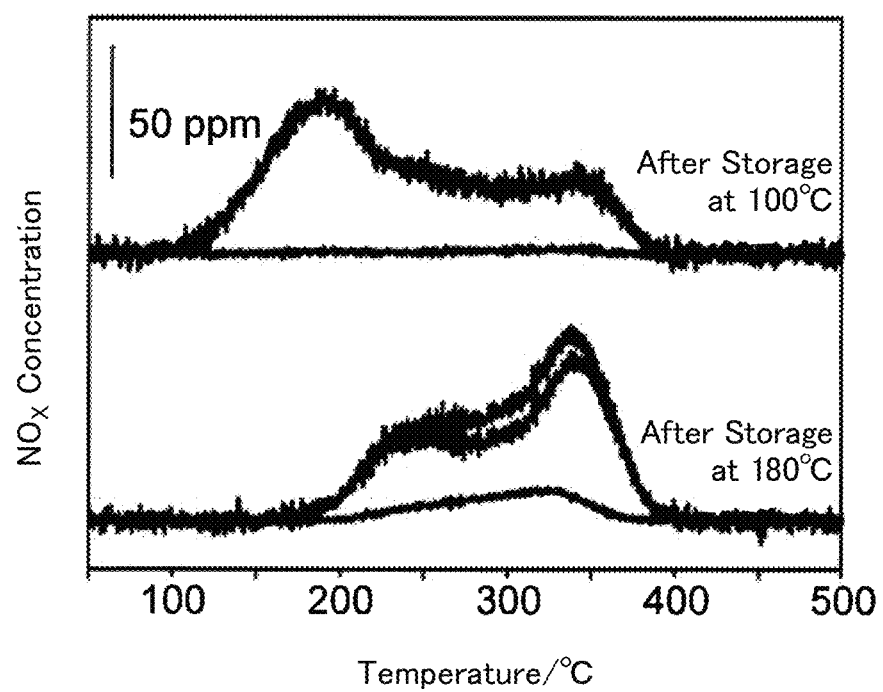
FIG. 12 is a graph illustrating an $NO_x$-TPD measurement profile.
Figure 13:
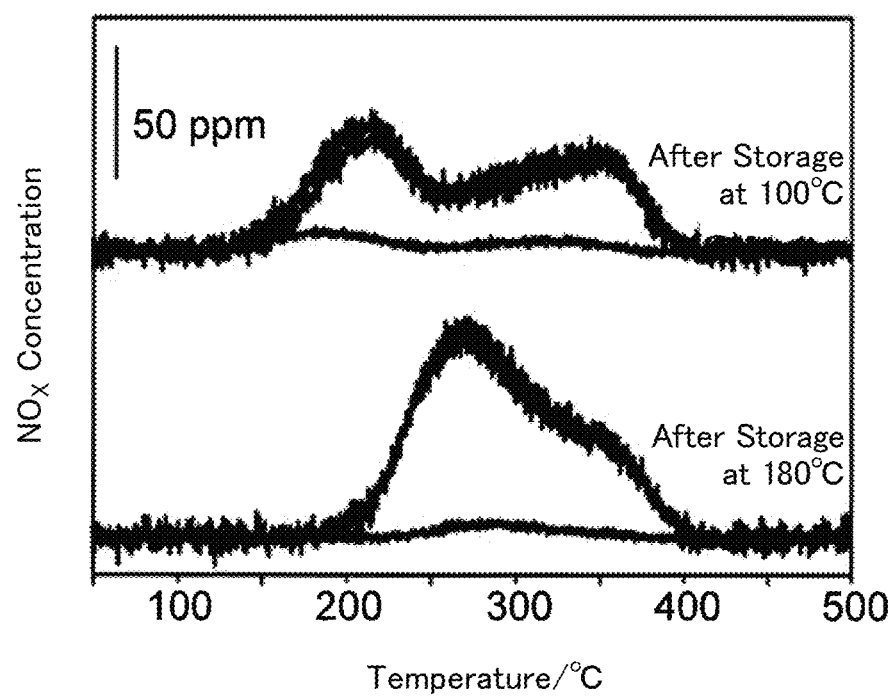
FIG. 13 is a graph illustrating an $NO_x$-TPD measurement profile.

FIG. 12 illustrates an $NO_x$-TPD measurement profile of Ag5Ga5 (Example 7), and FIG. 13 illustrates an $NO_x$-TPD measurement profile of Ag5Al2.5Ga2.5 (Example 6). In both samples, an $NO_x$ species exhibiting a desorption peak at 180° C. and an $NO_x$ species undergoing desorption in a higher temperature region than that were detected. The former $NO_x$ species undergoing desorption on the low temperature side was assigned to nitrite salt ($NO_2^-$) having low thermal stability, and the $NO_x$ species undergoing desorption on the high temperature side was assigned to nitrate salt ($NO_3^-$). On the other hand, in the $NO_x$-TPD measurement profile after storage at 180° C., desorption of nitrate salt on the high temperature side was predominated in both samples.

These results indicate that when part of Ga is substituted by Al, a large amount of nitrate salt is produced at 180° C., and it is presumed that the reason therefor is because the reactivity in oxide or of surface oxygen was increased and the conversion rate from nitrite salt with low thermal stability to nitrate salt with high thermal stability was thereby more accelerated than the desorption rate of nitrous acid.

What is claimed is:

1. An NOx storage material comprising a composite oxide of silver and gallium and an exhaust gas purification device having a catalyst metal downstream of said NOx storage material, wherein the concentration of the composite oxide is 1.7 mmol/g or more and the composite oxide is a delafossite-type composite oxide.

2. The NOx storage material and exhaust gas purification device according to claim 1, wherein the composite oxide further contains aluminum.

3. A method for producing the NOx storage material according to claim 1, comprising dissolving salts of metals constituting the composite oxide in a solvent, and baking the solution.

4. The method according to claim 3, wherein the molar ratio of silver:gallium or silver:(gallium+aluminum) in the composite oxide is from 2:8 to 7:3.

5. An NOx storage device having the NOx storage material according to claim 1.

6. An exhaust gas purification method comprising causing an exhaust gas discharged from an internal combustion engine to flow through the NOx storage device according to claim 5 and then flow through an exhaust gas purification device having a catalyst metal.

* * * * *